(12) United States Patent
Kandlikar (10) Patent No.: US 11,038,181 B2
(45) Date of Patent: Jun. 15, 2021

(54) FUEL CELLS WITH A NON-PARALLEL GAS FLOW CHANNEL CONFIGURATION AND METHODS THEREOF

(75) Inventor: Satish G. Kandlikar, Rochester, NY (US)

(73) Assignee: ROCHESTER INSTITUTE OF TECHNOLOGY, Rochester, NY (US)

( * ) Notice: Subject to any disclaimer, the term of this patent is extended or adjusted under 35 U.S.C. 154(b) by 774 days.

(21) Appl. No.: 13/231,672

(22) Filed: Sep. 13, 2011

(65) Prior Publication Data

US 2012/0077098 A1    Mar. 29, 2012

Related U.S. Application Data

(60) Provisional application No. 61/403,296, filed on Sep. 13, 2010.

(51) Int. Cl.
| | | |
|---|---|---|
| H01M 8/0263 | (2016.01) | |
| H01M 8/2457 | (2016.01) | |
| H01M 8/241 | (2016.01) | |
| H01M 8/2483 | (2016.01) | |
| H01M 8/0267 | (2016.01) | |
| H01M 8/04119 | (2016.01) | |
| H01M 8/1018 | (2016.01) | |

(52) U.S. Cl.
CPC ....... *H01M 8/0263* (2013.01); *H01M 8/0267* (2013.01); *H01M 8/04156* (2013.01); *H01M 8/241* (2013.01); *H01M 8/2457* (2016.02); *H01M 8/2483* (2016.02); *H01M 2008/1095* (2013.01)

(58) Field of Classification Search
CPC ............ H01M 8/04156; H01M 8/0258
See application file for complete search history.

(56) References Cited

U.S. PATENT DOCUMENTS

| | | |
|---|---|---|
| 4,476,196 A | 10/1984 | Poeppel et al. |
| 4,510,212 A | 4/1985 | Fraioli |
| 5,879,826 A * | 3/1999 | Lehman .............. H01M 8/0247 429/413 |
| 2006/0166053 A1* | 7/2006 | Badding et al. ............... 429/13 |
| 2009/0239120 A1* | 9/2009 | Moteki ............... H01M 8/0247 429/492 |
| 2011/0165493 A1* | 7/2011 | Okanishi .............. H01M 8/026 429/457 |

FOREIGN PATENT DOCUMENTS

| | | | |
|---|---|---|---|
| WO | WO2008050215 | * | 5/2008 |
| WO | WO 2010029758 | * | 3/2010 |

OTHER PUBLICATIONS

Peter Heidebrecht and Kai Sundmacher, "Dynamic Model of a Cross-Flow Molten Carbonate Fuel Cell with Direct Internal Reforming," Journal of the Electrochemical Society, 152 (11) 2005, pp. 2217-2228.
Kandlikar, et al., "Thermal Management Issues in a PEMFC Stack—A Brief Review of Current Status," Applied Thermal Engineering, 29:1276-1280 (2009).
Wikipedia, "Fuel Cell," at http://en.wikipedia.org/wiki/Fuel_cell (Jul. 19, 2010).

* cited by examiner

*Primary Examiner* — Ladan Mohaddes
(74) *Attorney, Agent, or Firm* — Bond, Schoeneck & King, PLLC; Joseph Noto (57) ABSTRACT

A fuel cell apparatus including a fuel cell comprising a membrane electrode assembly between an anode and a cathode, a first set of channels between the anode and the assembly, and a second set of channels between the cathode and the assembly. The first set of channels is spaced from and extends across a width of the second set of channels in a non-parallel configuration and at least one of the first or second set of channels are oriented to provide gravitationally assisted water removal; at least one of the first set or second set of channels has a shorter length than the other one of the first set and second set of channels; or at least one of the first set or second set of channels has intrusion regions that extend portions of the assembly into at least one of the first set or second set of channels.

26 Claims, 4 Drawing Sheets

FUEL CELLS WITH A NON-PARALLEL GAS FLOW CHANNEL CONFIGURATION AND METHODS THEREOF

This application claims the benefit of U.S. Provisional Patent Application Ser. No. 61/403,296, filed Sep. 13, 2010, which is hereby incorporated by reference in its entirety.

FIELD

The technology generally relates to fuel cells and, more particularly, to fuel cells with a non-parallel gas flow configuration and methods thereof.

BACKGROUND

Electrochemical reactions in a fuel cell are based on separation of positively charged ions and electrons on the surface of a catalyst layer (CL). In a Proton Exchange Membrane Fuel Cell (PEMFC), the positively charged hydrogen ions flow through the proton exchange membrane, while electrons flow through an external circuit to the cathode. Electrons, hydrogen ions and oxygen combine over the catalyst surface on the cathode side producing water and heat. Removal of product water is essential to avoid flooding of the catalyst region as well as passages in the gas diffusion layer (GDL) and the gas distribution channels. Separately or in various combinations, water management, pressure management, channel intrusions, and ease of manifolding may or may not be issues impacting the operation and performance of fuel cells. For example, at an elevated operating temperature in some types of fuel cells, water removal may or may not be a concern, while pressure drop of gases flowing in the channels and the intrusion of the GDL causing unsupported regions are of concern.

Figure 1:
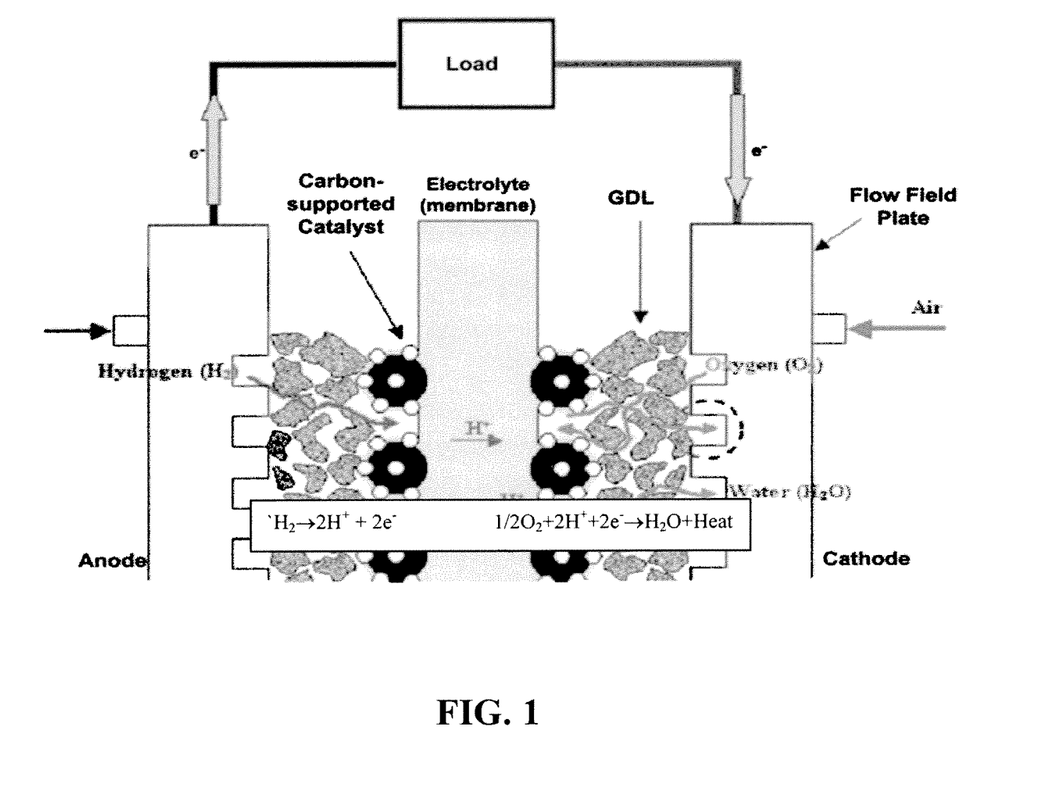
FIG. 1 is a schematic diagram of a PEMFC coupled to a load and illustrating electrode reactions.

A schematic of an exemplary PEMFC illustrating basic reactions and operation is shown in FIG. 1. The combination of materials between the anode side GDL and the cathode side GDL is referred to as Membrane Electrode Assembly (MEA). The voltage generated across the MEA is generally low, on the order of one volt. To provide higher voltage, fuel cells are assembled in series to form a fuel cell stack. In such arrangement, the anode of one cell is connected to the cathode of the next cell in series. In a practical device, a single plate is often used with respective gas flow channels on its two faces. Since this plate serves as anode on one side and cathode on the other side, it is called as bipolar plate.

The product of the electrochemical reaction is water which is generated at the cathode catalyst layer. Some of it flows back to the anode side as a new balance between different driving mechanisms such as back diffusion (from cathode side to anode side) and electroosmotic drag (from anode side to cathode side). However, most of the water is removed through the GDL on the cathode side flowing into the gas channels. The gas flowing in the gas channels carries water out of the fuel cell through evaporation or two-phase liquid-gas transport.

Another source of liquid water production is from condensation of moisture contained in the reactant streams. In case of a PEMFC, the membrane needs to be hydrated to increase its proton conductivity. This is generally accomplished by humidifying the inlet gas streams. Humidified hydrogen and air streams are generally introduced in the fuel cells to increase the membrane proton conductivity especially in the gas inlet regions. As the reactants are consumed along the respective flow directions in the gas flow channels, the moisture in the streams condenses depending on the local temperature, pressure, gas composition and humidity ratio. The product water also enters the gas channels. Liquid water removal from the channels, GDLs and CLs is an important consideration in the design of fuel cells.

In order to assist in water removal, GDLs are made of complex matrix of hydrophilic and hydrophobic surfaces. Channel cross-sectional shape and surface energy (hydrophobicity and hydrophilicity) of the channel surfaces also are designed to facilitate the water removal. Considerations in the water removal process in a PEMFC include two-phase pressure drop in channels, channel blockage with water, blockage of pore entries on the surface of the GDL at the channel interface by water covering the surface, and the water saturation in the GDLs and other regions of Membrane Electrode Assemblies (MEAs).

Water flooding the GDL structure is also undesirable as it blocks the pathways for gas transport to the reactant sites. Water removal becomes even more of a concern under freezing conditions in automotive application. The water in such conditions may freeze after shutdown making it difficult to start again and produce desired power levels quickly within the specified time limit after start-up. Purging is performed to remove the water at shutdown. Pressure drop, mass flow rate and purge duration during purge are also important considerations as they affect the overall energy efficiency of a fuel cell system.

Some of the considerations in the efficient operation of a PEMFC include low pressure drop in gas channels during two-phase flow and single phase gas flow conditions, removal of water from gas channels and GDL and Catalyst Layer (CL) regions, avoiding channel blockages, partial or complete flooding of different GDL regions, manifolds and bends.

Some of the commonly employed flow gas channel configurations in a fuel cells are straight channels, wavy channels, interdigitated channels, serpentine channels and some porous channels including pin fins. Previously, the gas flow in the anode and cathode sides of the channels has been a parallel flow or a counter flow.

SUMMARY

A fuel cell apparatus includes at least one fuel cell comprising a membrane electrode assembly between an anode and a cathode, a first set of one or more channels between the anode and the membrane electrode assembly, and a second set of one or more channels between the cathode and the membrane electrode assembly. The first set of channels is spaced from and extends across a width of each of the second set of channels in a non-parallel configuration and at least one of: at least one of the first set of channels or the second set of channels are oriented to provide gravitationally assisted water removal; at least one of the first set of channels or the second set of channels has a shorter length than the other one of the first set of channels and the second set of channels; or at least one of the first set of channels or the second set of channels has one or more intrusion regions that extend one or more portions of the membrane electrode assembly into at least one of the first set of channels or the second set of channels.

A method for making a fuel cell apparatus includes forming at least one fuel cell comprising a membrane electrode assembly between an anode and a cathode, forming a first set of one or more channels between the anode and the membrane electrode assembly, and forming a second set of one or more channels between the cathode and the membrane electrode assembly which are oriented to provide gravitationally assisted water removal. The first set of channels is spaced from and extends across a width of each of the second set of channels in a non-parallel configuration and at least one of: at least one of the first set of channels or the second set of channels are oriented to provide gravitationally assisted water removal; at least one of the first set of channels or the second set of channels has a shorter length than the other one of the first set of channels and the second set of channels; or at least one of the first set of channels or the second set of channels has one or more intrusion regions that extend one or more portions of the membrane electrode assembly into at least one of the first set of channels or the second set of channels.

This technology provides a number of advantages including providing a more effective and efficient fuel cell with a non-parallel gas flow configuration. More specifically, this technology assists separately or in various combinations with a number of issues with fuel cells, including water management, such as with minimizing flooding, blockage, and purging needs under freezing or cold start conditions, pressure management, channel intrusions, and ease of manifolding. A downward inclination of the overlapping channels in the fuel cell from inlet towards the outlet in one or both directions as well as other channel outlet modifications, such as enlarged outlet openings from these channels and rounded edges at the outlet openings can substantially improve water management issues. Additionally, adjustment of the lengths of the channels in the fuel cell in one or both directions assists with managing pressure drop. The non-parallel gas flow configuration can be used to manage intrusions of the membrane electrode assembly into the channels. Further, the non-parallel configuration simplifies the incorporation of manifolds for the gas flow channels as well as for any coolant channel manifolds.

DETAILED DESCRIPTION

Figure 2:
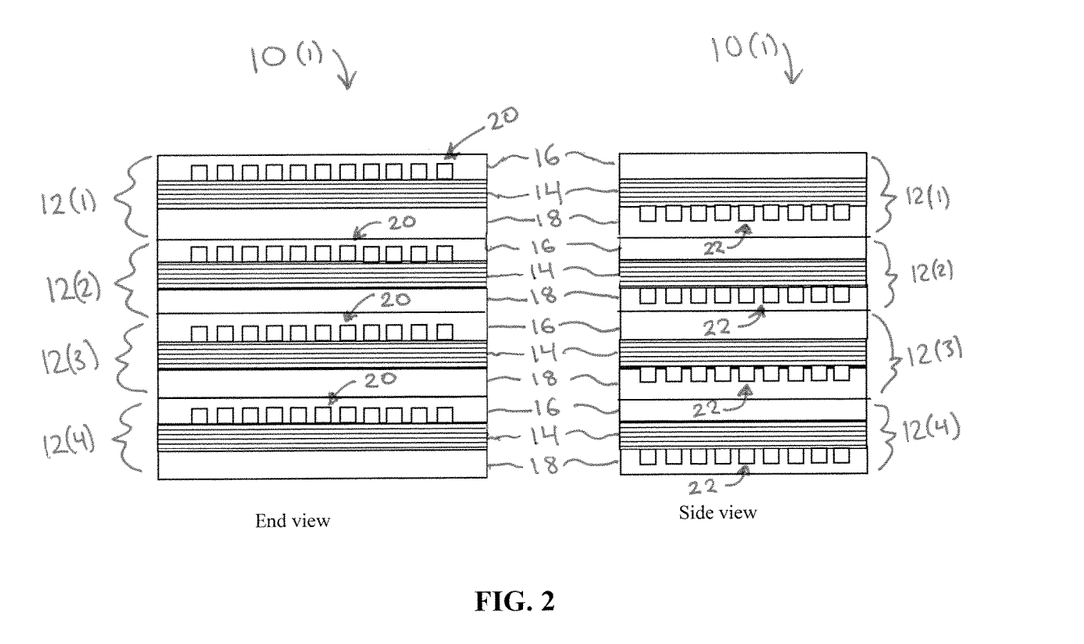
FIG. 2 are end and side views normal to gas flow channels of an exemplary PEMFC stack with a non-parallel gas flow configuration.
Figure 3:
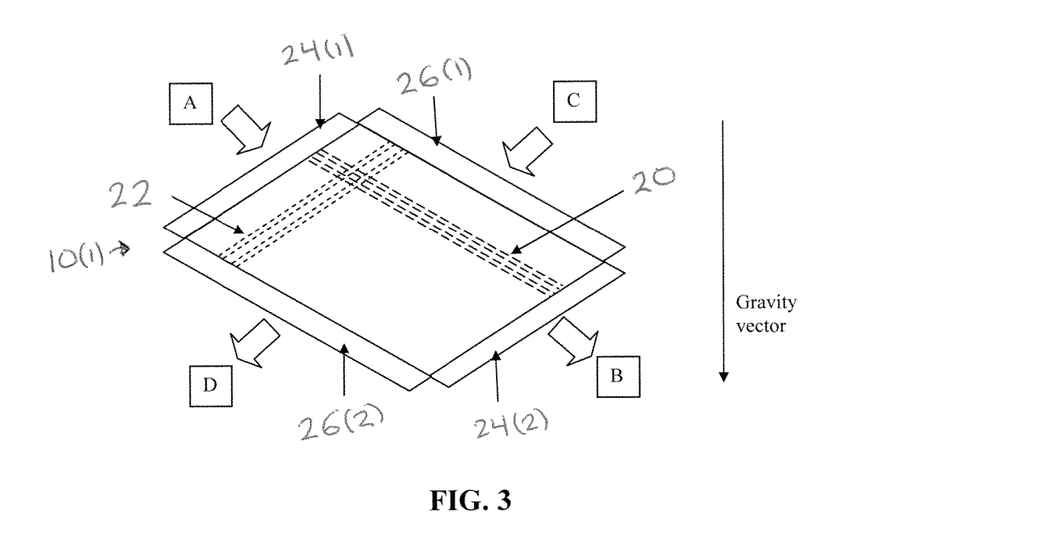
FIG. 3 is a top view of the exemplary PEMFC stack shown in FIG. 2 with manifolds and exemplary gas streams illustrated.

An exemplary fuel cell stack 10(1) with four fuel cells 12(1)-12(4) is illustrated in FIGS. 2-3, although the fuel cell stack could have other numbers and types of fuel cells. Each of the four fuel cells 12(1)-12(4) includes a membrane electrode assembly 14, an anode 16, a cathode 18, a first set of channels 20, a second set of channels 22, anode manifolds 24(1)-24(2), and cathode manifolds 26(1)-26(2), although each of the fuel cells can include other types and numbers of components and other elements in other configurations. This technology provides a number of advantages including providing a more effective and efficient fuel cell with a non-parallel gas flow configuration. As illustrated and described with the examples herein, this technology can be configured to assists separately or in various combinations with a number of issues with any type of fuel cells, including water management, such as with minimizing flooding, blockage, and purging needs under freezing or cold start conditions, pressure management, channel intrusions, and ease of manifolding.

Referring more specifically to FIGS. 2 and 3, the exemplary fuel cell stack 10(1) has four fuel cells 12(1)-12(4) which are each PEMFC with this technology, although the fuel cell stack could have other numbers and types of fuel cells which can be used with this technology. Since the structure and operations of PEMFC, as illustrated and described by reference to FIG. 1 by way of example, as well as other fuel cells are well known to those of ordinary skill in the art, they will not be described in detail herein.

In this example, the membrane electrode assembly 14 in each of the fuel cells 12(1)-12(4) has a gas diffusion layer (GDL) on each side which faces channels 20 and 22 and surround a Cathode Catalyst (CCL) Layer and an Anode Catalyst Layer (ACL), although membrane electrode assembly can include other types and numbers of components or other elements as needed to improve specific features, such as operational ease, efficiency, durability, and increased performance by way of example only. For example, the membrane electrode assembly 14 could also include an optional Microporous Layers (MPL).

The anode 16 and the cathode 18 for each of the fuel cells 12(1)-12(4) is a conductive plate, although other types and numbers of conductive plates or members could be used for the anode and/or cathode. For example, the anode 16 and cathode 18 between each of the fuel cells 12(1)-12(4) could comprise a bipolar conductive plate which has openings to channels 20 on a pair of opposing faces or sides and openings to channels 22 on another pair of opposing faces or sides of this plate.

The first set of channels 20 in each of the fuel cells is located between the anode 16 and the membrane electrode assembly 14, although other numbers and types of channels or other passages could be used. Additionally, the second set of channels 22 in each of the fuel cells 12(1)-12(4) is located between the cathode 18 and the membrane electrode assembly 14, although other numbers and types of channels or other passages could be used.

Referring more specifically to FIG. 3, a portion of the channels 20 and the channels 22 are shown in phantom in FIG. 3 to illustrate the non-parallel gas flow through these channels. In this example, the channels 20 are substantially orthogonal to the direction of the channels 22, although other non-parallel orientations could be used. The angle at which the sets of channels 20 and 22 cross may vary in different examples between: about 10 degrees and about 170 degrees; between about 30 degrees and about 150 degrees; and about 90 degrees in other examples which assist with water management issues and fuel cell stack design, although other ranges can be used. This non-parallel configuration of channels 20 and 22 assists with water management issues described earlier, such as flooding and blockage, purging needs under freezing or cold start conditions, and the incorporation of coolant channel manifolds in a fuel cell stack 10(2) as illustrated and described in greater detail below. Additionally, this non-parallel configuration of channels 20 and 22 provides higher strength and rigidity to each of the fuel cells 12(1)-12(4) and to the fuel cell stack 10(1). Further, this non-parallel arrangement allows separate anode manifolds 24(1)-24(2) for the openings at the input and output of each of the anode channels 20 and separate cathode manifolds 26(1)-26(2) for the openings at the input and output of each of the cathode channels 22, although gas intake structures could be used. As a result, with this technology the gas manifold design becomes simpler compared to the conventional parallel flow or counter flow arrangement where the two channels share the same faces of the fuel cell stack for their manifolds.

Additionally, in this example, the channels 20 and 22 each provide a substantially straight passage for gas and water flow, although one or more of the channels 20 and/or 22 in any of the fuel cells 12(1)-12(4) could have other orientations, such as a wavy or curved shape.

Further, in this example the channels 20 are longer than the channels 22, although the channels 20 and 22 could have other lengths with respect to each other. Shortening the length of channels 20 or 22 on one of the two sides, anode 16 or cathode 18, reduces the pressure drop on that side because pressure drop is directly proportional to the flow length. Additionally, a reduced length in channels 20 or 22 causes a reduced product water pickup in those channels 20 or 22 from the inlet to outlet. Reduction in flow length along one of the channels 20 or 22 also is advantageous during purging because the pressure drop is reduced and high water flow rates are avoided by shorter length channels 20 or 22.

In one example, the side with the openings to the channels 22 in the cathode 18 is chosen to have a shorter flow length than the channels 20 in the anode 16 for each of the fuel cells 12(1)-12(4). The amount of product water picked up in a channel increases as the flow length increases as more product water enters the channels. Also, more of oxygen is consumed and the moisture in the inlet stream also leads to increased condensation with flow lengths. In this example, the longer anode side channels 20 will require fewer channels 20 than cathode side channels 22. This is desirable to keep the hydrogen gas velocities relatively high as compared to the more number of shorter channels 22. The fewer anode side channels 20 will also allow for reduced flow rate of excess hydrogen above the stoichometric ratio in each of the fuel cells 12(1)-12(4).

In another embodiment, the side with the openings to the channels 20 in the anode 16 is chosen to have a shorter flow length than the channels 22 in the cathode 18 for each of the fuel cells 12(1)-12(4). The low velocities of hydrogen gases in these channels 20 may not be sufficient to remove water from theses channels 20 so the downward inclination from the inputs to the outputs of these channels 20 assists in removing any water and minimizing and/or elimination blockages.

Pressure drop during purging at the shutdown is also reduced by employing shorter flow lengths for the channels 22 on the cathode side as air purge is carried out on the cathode side. The energy consumed during purge also reduces with the reduced pressure drop. This reduces the pressure drop in single phase gas flow during purging and single and two-phase flow during operation of the fuel cell.

Further, in this example as illustrated by the gravity vector arrow shown in FIG. 3, when the fuel stack 10(1) is in a normal operating position the openings or inlets to the channels 20 adjacent each anode manifold 24(1) at the input are at a higher location than the openings to the channels 20 adjacent each anode manifold 24(2) at the output. Similarly, in this example when the fuel stack 10(1) is in a normal operating position the openings or inlets to the channels 22 adjacent each cathode manifold 26(1) at the output are at a higher location than the openings to the channels 22 adjacent each anode manifold 26(2) at the output, although one or both of the channels 20 and 22 for one or more of the fuel cells 12(1)-12(4) could have other orientations. As discussed earlier, this downward orientation or inclination of the channels 20 and 22 provides gravitationally assisted water removal from the fuel cells 12(1)-12(4) which helps to minimize or eliminate flooding or blockage in the channels 20 and 22 of the fuel cells 12(1)-12(4).

In one of the examples, the cathode side channels 22 are oriented in the downward direction to the gravity for water removal since majority of water in a PEMFC flows in the cathode side gas streams. In another embodiment, the anode side channels 20 are in the downward direction to the gravity for water removal since the hydrogen velocities are lower at the channel exit to provide effective force for water removal from the channels. In another example as shown in FIG. 3, the non-parallel arrangement and downward inclination is used to provide gravity assist on both the sides with the anode channels 20 and cathode channels 22. Further, in other examples this non-parallel gas flow configuration can be used where neither of the anode channels 20 or cathode channels 22 has a downward inclination and instead one or more other benefits are provided by this arrangement, such as with pressure management, ease of manifolding, and/or the intrusion of the GDL in one or more of the channels from the non-parallel overlapping configuration.

Water drainage at the exit from the channels 20 and 22 has traditionally been as issue that leads to flow blockages at the outlets of some of the channels 20 and 22 in a parallel channel array. The increased availability of space with the non-parallel configuration, i.e. the non-parallel configuration results in the openings to the channels 20 and 22 being on different faces or sides of the fuel stack 10(1), also allows for incorporation of simple and optional drainage techniques at the outlets from these channels 20 and 22. For example: (i) the exit openings of channels 20 and/or 22 could be enlarged to reduce the effects due to surface tension forces which are responsible to cause the bridging; (ii) the exit openings of channels 20 and/or 22 could be rounded to assist with drainage: (iii) spout-like extensions, such as the spout 32 shown in FIG. 5 by way of example only, could be incorporated at one or more of the exit openings or outlets of channels 20 and/or 22; and (iv) a water drainage assistance device (not shown) could be incorporated to facilitate water drainage from exit openings of channels 20 and/or 22 into manifolds 24(2) and/or 26(2); and (v) another water drainage assistance device (not shown) could be incorporated to facilitate water drainage from manifolds 24(2) and/or 26(2) into an exit pipe (not shown).

Referring more specifically to FIG. 3, the anode manifold 24(1) is coupled about the openings to the channels 20 for each of the fuel cells 12(1)-12(4) on an input side as illustrated by arrow A, although other types and numbers of gas intake structures could be used. The anode manifold 24(2) is coupled about the openings to the channels 20 for each of the fuel cells 12(1)-12(4) on an output side as illustrated by arrow B, although other types and numbers of gas intake structures could be used. Similarly in this example the cathode manifold 26(1) is coupled about the openings to the channels 22 for each of the fuel cells 12(1)-12(4) on an input side as illustrated by arrow C, although other types and numbers of gas intake structures could be used. The cathode manifold 26(2) is coupled about the openings to the channels 22 for each of the fuel cells 12(1)-12(4) on an output side as illustrated by arrow D, although other types and numbers of gas intake structures could be used. In this example, air instead of oxygen is used as the gas in channels 22, although other types of gases or other fluids could be used in either of the channels 20 and 22 as needed for the particular type of fuel cell.

The water management in the manifolds 24(1)-24(2) and 26(1)-26(2) becomes easier as the complex manifolding required in the prior art to accommodate both anode and cathode gas stream manifolds on the same face lead to the use of more narrow channels or passages resulting in large pressure drop and possibility of water bridge formation over the narrow openings in these conventional prior art fuel cells. With the non-parallel configuration of the channels 20 and 22 as illustrated and described with the examples herein, there is more space available for the manifolds 24(1)-24(2) and 26(1)-26(2) as they are located on different faces or sides of the fuel cell stack 10(1).

The increased space for manifolds 24(1)-24(2) and 26(1)-26(2) also allows for collection of water coming out from the channels 20 and/or 22 that can be easily separated from the air stream by any of the techniques for gas-liquid water separation, such as drain valve with a level sensor at the bottom region of the manifold space where water will accumulate due to gravity by way of example only. This water may be reused for humidifying the inlet gas streams to limit the overall additional water requirements to run one or more of the fuel cells 12(1)-12(4).

Figure 4:
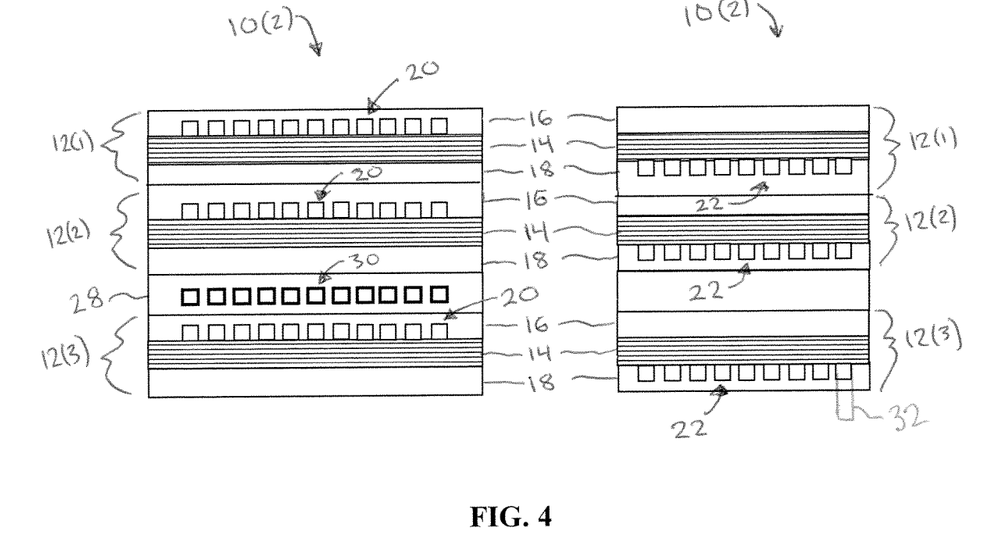
FIG. 4 are end and side views normal to gas flow channels of another exemplary PEMFC stack with a non-parallel gas flow configuration and a coolant plate with coolant channels.

Referring to FIG. 4, another exemplary fuel cell stack 10(2) is illustrated. Fuel stack 10(2) is the same in structure and operation as fuel stack 10(1), except as illustrated and described herein. Elements in fuel stack 10(2) which are like those in fuel stack 10(1) will have like reference numerals.

In this example, fuel stack 10(2) has three fuel cells 12(1)-12(3) with a coolant plate 28, although the fuel stack 10(2) could have other types and numbers of components and elements in other configurations, such as other numbers of fuel cells and at least one coolant plate 28. The coolant plate 28 is positioned between the plate for the cathode 18 of fuel cell 12(2) and the plate for the anode 16 of fuel cell 12(3), although the coolant plate could be at other locations in the fuel cell stack 10(2). The coolant plate 28 has a plurality of coolant channels 30 with a straight configuration which extend through the coolant plate 28, although the coolant plate could have other numbers and types of channels in other configurations, such as channels which are curved or comprise multiple paths by way of example only. The coolant manifolds (not shown in FIG. 4) are connected to the inlets and outlets of channels 30 about coolant plate 28 and pose less of a challenge to incorporate because of the additional space provided by the non-parallel arrangement of channels 20 and 22.

Figure 5:
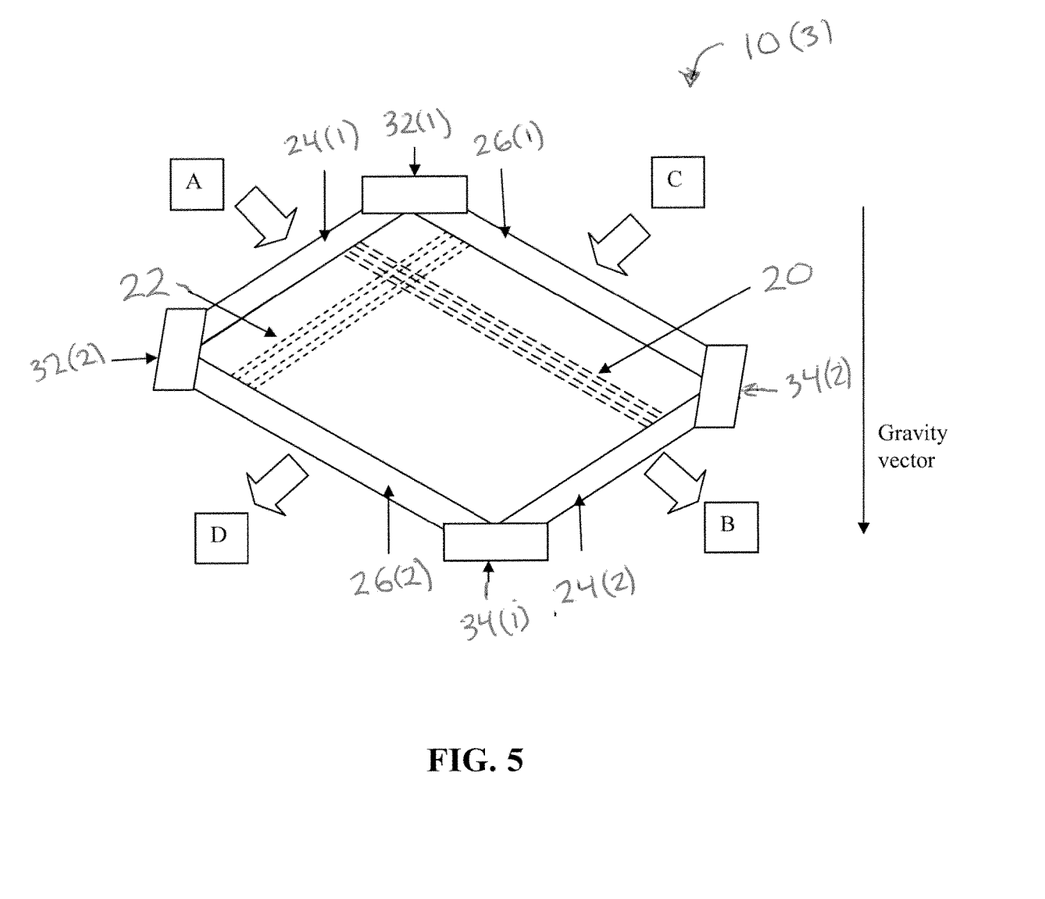
FIG. 5 is a top view of yet another exemplary PEMFC stack with a non-parallel gas flow configuration and a coolant plate with diagonal coolant channels and coolant manifolds.

Referring to FIG. 5, another exemplary fuel cell stack 10(3) is illustrated. Fuel stack 10(3) is the same in structure and operation as fuel stack 10(2), except as illustrated and described herein. Elements in fuel stack 10(3) which are like those in fuel stack 10(2) will have like reference numerals.

In this example, fuel stack 10(3) has a coolant plate with two sets of channels extending in a diagonal, one set of coolant channels between inlets adjacent a coolant manifold 32(1) to outlets at a coolant manifold 34(1) and another set of coolant channels between inlets adjacent a coolant manifold 32(2) to outlets at a coolant manifold 34(2), although other numbers of coolant plates with other numbers and orientations for the direction of the coolant channels can be used, such as parallel with either channels 20 or 22. The sets of coolant manifolds 32(1)-34(1) and 32(2)-34(2) are located in the corner regions of the fuel stack 10(3) to further alleviate the space problem.

With the fuel cell stacks 10(2) and 10(3) shown in FIGS. 4 and 5, the direction of the coolant channels can be made parallel, counter, diagonal or a combination of these to yield the desired temperature distribution within the fuel cell stack 10(2) or 10(3). One or more of the coolant channels also optionally could be connected to a recirculation device with a heating unit (not shown) to raise the temperature of the coolant to assist with start-up during freezing or cold conditions.

Although the examples described above use a proton exchange membrane with hydrogen as the fuel cell, this technology can be used with other types of fuel cells as well. The benefits may be different depending on the type of fuel cell. Additionally, with this technology the issues noted in the background are effectively mitigated by forming and using a non-parallel channel configuration in a fuel cell, such as the exemplary fuel cell illustrated in FIG. 1.

There are other additional benefits of incorporating the non-parallel configuration as illustrated and described with the examples herein. One other additional benefit relates to the intrusion of the GDL of the membrane electrode assembly 14 and the second one relates to the droplet removal from the GDL surface into the channel. The non-parallel configuration leads to GDL of the membrane electrode assembly 14 being compressed by the intersecting land regions on the two sides in a crisscross fashion. This causes the GDL of the membrane electrode assembly 14 to be in an uncompressed state at small approximately parallelogram shaped sections along the lengths of the channels 20 and 22. Along a channel length, these uncompressed regions are followed by regions that are supported by the lands on the other side. This will cause the GDL of the membrane electrode assembly 14 to intrude differently in these two regions resulting in an uneven GDL surface along the length of channels 20 and 22. The regions with lower intrusion lead to greater area available for gas flow resulting in lower pressure drop.

Another advantage of the crisscross patterned intrusion is that these crisscross regions with resulting uneven GDL surface in the channels 20 and 22 act as periodic roughness elements in the gas flow channels 20 and 22, increase the mixing of the gases in the channels 20 and 22 and improve the transport of gases from the channel 20 and 22 to the reaction sites through the GDL of the membrane electrode assembly 14. The increased mixing also leads to more efficient and quicker removal of water droplets emerging from the GDL of the membrane electrode assembly 14 in the channels 20 and/or 22. As a result, with this technology the water droplets are removed when they are smaller which reduces the pressure drop because larger droplets act as bigger obstructions. Further, the smaller droplets on the GDL of the membrane electrode assembly 14 result in lower coverage of the GDL of the membrane electrode assembly 14 with water and allow for a larger area to be available for gas transport than that in conventional prior art fuel cells.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A fuel cell apparatus comprising:
at least one fuel cell comprising a proton exchange membrane electrode assembly between an anode plate and a cathode plate, the proton exchange membrane electrode assembly comprises an anode-side gas diffusion layer, anode catalyst layer, cathode-side gas diffusion layer, cathode catalyst layer and membrane, wherein the anode catalyst layer is disposed between the anode-side gas diffusion layer and the membrane and wherein the cathode catalyst layer is disposed between the cathode-side gas diffusion layer and the membrane;
the anode plate comprising a first set of a plurality of adjacent individual open gas flow channels embedded in the anode plate open to and adjacent the anode-side gas diffusion layer, each individual channel of the first set of a plurality of adjacent individual open gas flow channels extending between an input opening connected to a first anode manifold and an output opening connected to a second anode manifold; and
the cathode plate comprising a second set of a plurality of adjacent individual open gas flow channels embedded in the cathode plate open to and adjacent the cathode-side gas diffusion layer, each individual channel of the second set of a plurality of adjacent individual open gas flow channels extending between an input opening connected to a first cathode manifold and an output opening connected to a second cathode manifold; wherein
the first set of a plurality of adjacent individual open gas flow channels is spaced from and extends across a width of each individual channel of the second set of a plurality of adjacent individual open gas flow channels in a non-parallel configuration along their entire length and at least one individual gas flow channel in the first set of a plurality of adjacent individual open gas flow channels is disposed in a downward inclination to gravity along its entire length extending along the anode-side gas diffusion layer and at least one individual gas flow channel in the second set of a plurality of adjacent individual open gas flow channels is disposed in a downward inclination to gravity along its entire length extending along the cathode-side gas diffusion layer.

2. The fuel cell apparatus as set forth in claim 1 wherein the first set of a plurality of adjacent individual open gas flow channels extend across the second set of a plurality of adjacent individual open gas flow channels at an angle between the two sets of a plurality of adjacent individual open gas flow channels of about 10 degrees to 170 degrees.

3. The fuel cell apparatus as set forth in claim 1 wherein the first set of a plurality of adjacent individual open gas flow channels extend across the second set of a plurality of adjacent individual open gas flow channels at an angle between the two sets of a plurality of adjacent individual open gas flow channels of about 30 degrees to 150 degrees.

4. The fuel cell apparatus as set forth in claim 1 wherein the first set of a plurality of adjacent individual open gas flow channels extend across the second set of a plurality of adjacent individual open gas flow channels at an angle between the two sets of a plurality of adjacent individual open gas flow channels of about 90 degrees.

5. The fuel cell apparatus as set forth in claim 1 wherein the first set of a plurality of adjacent individual open gas flow channels has a shorter length than the second set of a plurality of adjacent individual open gas flow channels.

6. The fuel cell apparatus as set forth in claim 1 wherein the second set of a plurality of adjacent individual open gas flow channels has a shorter length than the first set of a plurality of adjacent individual open gas flow channels.

7. The fuel cell apparatus as set forth in claim 1 wherein the output opening from one or more of the individual gas flow channels of at least one of the first set of a plurality of adjacent individual open gas flow channels and the second set of a plurality of adjacent individual open gas flow channels is enlarged.

8. The fuel cell apparatus as set forth in claim 1 further comprising an external spout attached to the output opening from one or more of the individual gas flow channels of at least one of the first set of a plurality of adjacent individual open gas flow channels and the second set of a plurality of adjacent individual open gas flow channels.

9. The fuel cell apparatus as set forth in claim 1 further comprising a fluid collection apparatus positioned to capture at least a portion of fluid discharged from the at least one of the first set of a plurality of adjacent individual open gas flow channels and the second set of a plurality of adjacent individual open gas flow channels.

10. The fuel cell apparatus as set forth in claim 1 wherein the first set of a plurality of adjacent individual open gas flow channels extend across the second set of a plurality of adjacent individual open gas flow channels at an angle between the two sets of a plurality of adjacent individual open gas flow channels of less than about 90 degrees.

11. The fuel cell apparatus as set forth in claim 1 wherein the first set of a plurality of adjacent individual open gas flow channels extend across the second set of a plurality of adjacent individual open gas flow channels at an angle between the two sets of a plurality of adjacent individual open gas flow channels of greater than about 90 degrees and less than about 170 degrees.

12. A method for making a fuel cell apparatus, the method comprising:
forming at least one fuel cell comprising a proton exchange membrane electrode assembly between an anode plate and a cathode plate, the proton exchange membrane electrode assembly comprising an anode-side gas diffusion layer, anode catalyst layer, cathode-side gas diffusion layer, cathode catalyst layer and membrane, wherein the anode catalyst layer is disposed between the anode-side gas diffusion layer and the membrane and wherein the cathode catalyst layer is disposed between the cathode-side gas diffusion layer and the membrane;
forming the anode plate comprising a first set of a plurality of adjacent individual open gas flow channels embedded in the anode plate open to and adjacent the anode-side gas diffusion layer, each individual channel extending between an input opening connected to a first anode manifold and an output opening connected to a second anode manifold; and
forming the cathode plate comprising a second set of a plurality of adjacent individual open gas flow channels embedded in the cathode plate open to and adjacent the cathode-side gas diffusion layer, each individual channel extending between an input opening connected to a first cathode manifold and an output opening connected to a second cathode manifold, wherein the first set of a plurality of adjacent individual open gas flow channels is spaced from and extends across a width of each of the second set of a plurality of adjacent individual open gas flow channels in a non-parallel configuration along their entire length and the flow direction in at least one individual gas flow channel in the first set of a plurality of adjacent individual open gas flow channels is disposed in a downward inclination to gravity along its entire length extending along the anode-side gas diffusion layer and at least one individual gas flow channel in the second set of a plurality of adjacent individual open gas flow channels is disposed in a downward inclination to gravity along its entire length extending along the cathode-side gas diffusion layer.

13. The method as set forth in claim 12 wherein the forming the first set of a plurality of adjacent individual open gas flow channels further comprises forming the first set of a plurality of adjacent individual open gas flow channels to extend across the second set of a plurality of adjacent individual open gas flow channels at an angle between the two sets of a plurality of adjacent individual open gas flow channels of about 10 degrees to 170 degrees.

14. The method as set forth in claim 12 wherein the forming the first set of a plurality of adjacent individual open gas flow channels further comprises forming the first set of a plurality of adjacent individual open gas flow channels to extend across the second set of a plurality of adjacent individual open gas flow channels at an angle between the two sets of a plurality of adjacent individual open gas flow channels of about 30 degrees to 150 degrees.

15. The method as set forth in claim 12 wherein the forming the first set of a plurality of adjacent individual open gas flow channels further comprises forming the first set of a plurality of adjacent individual open gas flow channels to extend across the second set of a plurality of adjacent individual open gas flow channels at an angle between the two sets of a plurality of adjacent individual open gas flow channels of about 90 degrees.

16. The method as set forth in claim 12 wherein the first set of a plurality of adjacent individual open gas flow channels has a shorter length than the second set of a plurality of adjacent individual open gas flow channels.

17. The method as set forth in claim 12 wherein the second set of a plurality of adjacent individual open gas flow channels has a shorter length than one of the first set of a plurality of adjacent individual open gas flow channels.

18. The method as set forth in claim 12 further comprising forming an enlarged output opening from one or more of the individual gas flow channels of at least one of the first set of a plurality of adjacent individual open gas flow channels and the second set of a plurality of adjacent individual open gas flow channels.

19. The method as set forth in claim 12 further comprising attaching an external spout to the output opening from one or more of the individual gas flow channels of at least one of the first set of a plurality of adjacent individual open gas flow channels and the second set of a plurality of adjacent individual open gas flow channels.

20. The method as set forth in claim 12 further comprising positioning a fluid collection apparatus to capture at least a portion of fluid discharged from at least one of the first set of a plurality of adjacent individual open gas flow channels and the second set of a plurality of adjacent individual open gas flow channels.

21. The method as set forth in claim 12 wherein the first set of a plurality of adjacent individual open gas flow channels extend across the second set of a plurality of adjacent individual open gas flow channels at an angle between the two sets of a plurality of adjacent individual open gas flow channels of less than about 90 degrees.

22. The method as set forth in claim 1 wherein the first set of a plurality of adjacent individual open gas flow channels extend across the second set of a plurality of adjacent individual open gas flow channels at an angle between the two sets of a plurality of adjacent individual open gas flow channels of greater than about 90 degrees and less than about 170 degrees.

23. The fuel cell apparatus as set forth in claim 1 wherein each individual gas flow channel in the first set of a plurality of adjacent individual open gas flow channels is disposed in a downward inclination to gravity along the entire length extending along the anode-side gas diffusion layer and each individual gas flow channel in the second set of a plurality of adjacent individual open gas flow channels is disposed in a downward inclination to gravity along the entire length extending along the cathode-side gas diffusion layer.

24. The fuel cell apparatus as set forth in claim 1 wherein an entire path of product water removal is disposed in a downward inclination to gravity.

25. The method as set forth in claim 12 wherein each individual gas flow channel in the first set of a plurality of adjacent individual open gas flow channels is disposed in a downward inclination to gravity along the entire length extending along the anode-side gas diffusion layer and each individual gas flow channel in the second set of a plurality of adjacent individual open gas flow channels is disposed in a downward inclination to gravity along the entire length extending along the cathode-side gas diffusion layer.

26. The method as set forth in claim 12 wherein an entire path of product water removal is disposed in a downward inclination to gravity.

* * * * *